(12) United States Patent
Wustlich

(10) Patent No.: US 10,133,965 B2
(45) Date of Patent: Nov. 20, 2018

(54) METHOD FOR TEXT RECOGNITION AND COMPUTER PROGRAM PRODUCT

(71) Applicant: Planet AI GmbH, Raben Steinfeld (DE)

(72) Inventor: Welf Wustlich, Raben Steinfeld (DE)

(73) Assignee: Planet A1 GbmH, Raben Steinfeld (DE)

(*) Notice: Subject to any disclaimer, the term of this patent is extended or adjusted under 35 U.S.C. 154(b) by 0 days.

(21) Appl. No.: 15/128,150

(22) PCT Filed: Dec. 2, 2015

(86) PCT No.: PCT/EP2015/078371
§ 371 (c)(1),
(2) Date: Sep. 22, 2016

(87) PCT Pub. No.: WO2016/087519
PCT Pub. Date: Jun. 9, 2016

(65) Prior Publication Data
US 2017/0124435 A1    May 4, 2017

(30) Foreign Application Priority Data
Dec. 5, 2014  (EP) .................................. 14196570

(51) Int. Cl.
*G06F 17/27*    (2006.01)
*G06K 9/62*     (2006.01)
*G06K 9/72*     (2006.01)
*G06F 17/30*    (2006.01)

(52) U.S. Cl.
CPC ......... *G06K 9/723* (2013.01); *G06F 17/2705* (2013.01); *G06F 17/2735* (2013.01);
(Continued)

(58) Field of Classification Search
CPC .. G06K 9/723; G06K 9/6296; G06K 2209/01; G06F 17/2705; G06F 17/2735; G06F 17/30675
See application file for complete search history.

(56) References Cited

U.S. PATENT DOCUMENTS 7,865,354 B2 *  1/2011  Chitrapura .......... G06F 17/2785
704/4
2003/0101163 A1  5/2003  Lui et al.
(Continued)

OTHER PUBLICATIONS

Regular expression—Wikipedia, downloaded from Wikipedia, Sep. 27, 2017—[See, especially section 3 ("Basic concepts"—describes grouping using parentheses).*
(Continued)

*Primary Examiner* — Yubin Hung
(74) *Attorney, Agent, or Firm* — Eversheds Sutherland (US) LLP

(57) ABSTRACT

The invention refers to a method for text recognition, wherein the method is executed by a processor of a computing device and comprises steps of providing a confidence matrix, wherein the confidence matrix is a digital representation of an input sequence, entering a regular expression, searching for a symbol sequence of the input sequence that matches the regular expression, wherein a score value is computed by the processor using confidence values of the confidence matrix, wherein the score value is an indication of the quality of the matching between the symbol sequence of the input sequence and the regular expression. Further, the invention relates to a computer program product which when executed by a processor of a computing device performs the method.

8 Claims, 4 Drawing Sheets

(52) U.S. Cl.
CPC ..... G06F 17/30675 (2013.01); G06K 9/6296 (2013.01); *G06K 2209/01* (2013.01)

(56) References Cited

U.S. PATENT DOCUMENTS

| | | | |
|---|---|---|---|
| 2007/0265833 A1* | 11/2007 | Nakayama | G06F 17/218 704/10 |
| 2009/0077053 A1 | 3/2009 | Lallican | |
| 2010/0074534 A1 | 3/2010 | Oliver et al. | |
| 2010/0195909 A1* | 8/2010 | Wasson | G06F 17/241 382/176 |
| 2013/0318110 A1* | 11/2013 | Develyn | G06K 9/00449 707/755 |
| 2014/0244668 A1* | 8/2014 | Barrus | G06F 17/30289 707/752 |

OTHER PUBLICATIONS

Goyvaerts, J. ("Regular Expressions: The Complete Tutorial," 2006).*

Halavati et al. ("Evolution of Multiple States Machines for Recognition of Online Cursive Handwriting," 2006 World Automation Congress, Jul. 24-26, 2006).*

PCT International Search Report and Written Opinion for PCT Application No. PCT/EP2015/078371 dated Feb. 12, 2016 (12 pages).

Graves et al., "A Novel Connectionist System for Unconstrained Handwriting Recognition," IEEE Transactions of Pattern Analysis and Machine Intelligence, 2009, 31(5):855-868.

Lecun et al., "Gradient-Based Learning Applied to Document Recognition," Proceedings of the IEEE, 1998, 86(11):2278-2323.

* cited by examiner

METHOD FOR TEXT RECOGNITION AND COMPUTER PROGRAM PRODUCT

CROSS REFERENCE TO RELATED APPLICATIONS

This application is a U.S. national stage application of PCT/EP2015/078371, filed Dec. 2, 2015, which claims priority to European Application No. 14196570.7, filed Dec. 5, 2014. The contents of these applications are hereby incorporated by reference.

The disclosure relates to a method for text recognition and a computer program product.

BACKGROUND

Computer aided information retrieval out of historical manuscripts or other document types as well as from sequences of spoken text is still very difficult and limited.

A direct search based on sample sequences is a very slow procedure and does not generalize to other writing styles or other accents in speech. A search based on pre-transcribed computer code (e.g. ASCII) is fast, but it requires an expensive (time and human resources) and error-prone manual transcription process.

The document A. Graves, et al., "A Novel Connectionist System for Unconstrained Handwriting Recognition", IEEE Transactions of pattern analysis and machine intelligence, vol. 31, no. 5, May 2009 discloses a method for recognizing unconstrained handwritten text. The approach is based on a recurrent neural network which is designed for sequence labeling task where the data is hard to segment and contains long-range bidirectional interdependencies.

Document US 2009/0077053 A1 discloses a method for searching a term in a set of ink data. The method includes an operation for converting ink data into intermediate data in an intermediate format in the form of at least one segmentation graph. Each node of the graph includes at least one ink segment associated with at least one assumption of correspondence with a recognition unit. The method further includes an operation for searching for the term carried out on the intermediate data.

SUMMARY

It is an object to provide improved technologies for text recognition.

A method for text recognition according to independent claim 1 and a computer program product according to independent claim 9 are provided. Further embodiments are subject matter of dependent claims.

In one aspect, a method for text recognition is provided. The method is executed by a processor of a computing device and comprises steps of: providing a confidence matrix, wherein the confidence matrix is a digital representation of an input sequence, entering a regular expression, and searching for a symbol sequence of the input sequence that matches the regular expression, wherein a score value is computed by the processor using confidence values of the confidence matrix, wherein the score value is an indication of the quality of the matching between the symbol sequence of the input sequence and the regular expression. The step of searching is performed on the confidence matrix. In other words, the regular expression can be applied directly on the confidence matrix for decoding the symbol sequence.

In another aspect, a computer program product is disclosed, wherein the computer program product is adapted to perform the steps of the method when executed by a processor of a computing device. The computer program product can be stored on a non-transitory medium.

A confidence matrix (also called ConfMat) is a 2-dimensional matrix of arbitrary length, containing a vector of dimension N at each position at the horizontal axis (x-axis or t-axis). Each vector element corresponds to a certain symbol channel. For example, in case the digits 0 to 9 are encoded, N=10 symbol channels are needed. An additional channel may be introduced, the NaC-channel (Not a Character-channel). The NaC-channel represents the complement of all other coded symbol channels (e g unknown symbols or symbol transitions). Each horizontal position within the matrix corresponds to a certain position of the input sequence. This can be a 1:1 mapping or a 1:S mapping, wherein matrix column x corresponds to input sequence position x*S. S is called the subsampling factor.

A confidence value is a real number value correlated to the confidence or even probability for a certain symbol at the corresponding position in the input sequence. The higher the confidence value, the higher or more assured is the classifier (e.g. a classifier module) to "see" a certain symbol at the specific sequence position. The confidence value may be a pseudo-probability. Such estimation of a probability allows a clean mathematical treatment. Also, other confidence values can be used.

A regular expression (also called RegEx) is a sequence of characters, describing a set of strings, forming search patterns with strings, e.g. for string matching or "find and replace" operations. Each character in a regular expression can be either understood to be a metacharacter with its special meaning, or a regular character with its literal meaning. The pattern sequence itself is an expression that is a statement in a language designed specifically to represent prescribed targets in the most concise and flexible way to direct the automation of text processing of general text files, specific textual forms, or of random input strings.

The input sequence can be provided in form of written text or spoken text. The step of providing the confidence matrix can include transforming a written text or a spoken text into the confidence matrix, for example using a classifier module. The written text can be provided by scanning a document in order to provide a digital version of the text. The document may comprise hand-written text. The spoken text can be provided as an audio file.

The input sequence can comprise one or more symbols. Several symbols may form a symbol sequence. The symbol may comprise a letter (e.g. A to Z, a to z), a numerical digit (e.g. 0 to 9), a punctuation mark (such as ".", "?" or "-"), a control sign (e.g. "@") and a whitespace.

The regular expression can comprise one or more embedded dictionaries. The embedded dictionary provides one or more terms and can be considered as a placeholder. It may contain any string. For example, the dictionary may comprise a list of cities. The cities can be included in the regular expression via the dictionary.

The regular expression may comprise a regular expression group (also called RegEx-group). The regular expression may define labeled regions in the regular expression for parsing on the confidence matrix. A RegEx-group is a subsequence of characters between a left and a right parenthesis. The RegEx-group may be labeled, so that the subsequence can be accessed in the workflow by its label. The regular expression can comprise several RegEx-groups, which may be labeled. For example, a regular expression group may be defined as RegEx="(?<HNr>[0-9]{1,4}[A-Za-z]?) ?(?<street>[[:dictStreet:]])". An address like "14 A Hamburger Straße" may be handwritten without gaps between the address parts (thus handwritten "14AHamburgerStraße"). Using the regular expression, this address will be correctly identified as HNr. (house number): 14A and street name: Hamburger Straße. There will be no wrong recognition as HNr.: 14 and street name "AHamburger Straße". A parsing of the address without the regular expression group is not possible. For analyzing and labeling the elements of the address, the regular expression including the dictionary is necessary. This allows a direct search for the "best" symbol sequence for a given confidence matrix.

The confidence matrix may be a digital representation of a structured or semi-structured input sequence. The method may further comprise a step of parsing the structured or semi-structured input sequence using the regular expression. RegEx-Groups are a powerful parsing tool for structured and semi-structured text. The method may provide corresponding subsequences for all defined RegEx-Groups, facilitating an intelligent parsing of the input sequence into relevant sub-components. The method may further comprise a step of labeling the input sequence, wherein a score value is assigned to each element of the input sequence.

Structured data has a unique data model. Single elements of the structured data can be labeled directly. For example, in a table, each column has its label. Semi-structured data can be brought into a structured form using a grammar and a lexis. After structuring the semi-structured data, single elements can be labeled.

Whether data is structured, semi-structured or even unstructured has no influence on the confidence matrix. However, it has an influence of the decoding, namely the evaluation of the confidence matrix using the regular expression. The structure of the data may comprise so-called constraints for the decoding. With other words, only possible but no senseless tags are "allowed". These decoding conditions are formulated using the regular expression. The regular expression is necessary for decoding semi-structured data because type and number of the identifying elements are not known a priori.

A RegEx can be a simple string, in case it represents a specific word, or a complex expression including one or several embedded dictionaries and/or RegEx-groups in case a sequence with a complex pattern shall be parsed (e.g. for postal address, email addresses, date and time, etc). Valid matches can be provided as a list sorted by scores. RegEx-groups can represent subsequences and, therefore, support very complex parsing schemes. RegEx-groups can be used to reproduce the content of the input sequence associated with the group. For example, a RegEx-group may comprise five digits (e.g. a postal code). All examples of five digits found in the input sequence can be reproduced via the RegEx-group.

The method may further comprise transcribing the input sequence into a symbol sequence or a character-encoding scheme. For example, the input sequence can be transcribed in an ASCII text (ASCII—American Standard Code for Information Interchange). The transcription may be performed context-sensitive and/or based on one or more dictionaries.

The method is very fast and fault-tolerant. It does not require any manual transcription of content. It enables very complex search approaches using regular expressions, for example including embedded dictionaries and RegEx-Groups, like email addresses, phone numbers, clearing limits in radio communication etc. Parsing, namely splitting a sequence of characters into relevant components, of structured and semi-structured written and spoken input sequences may be applied for e.g. forms, addresses, radio communication between pilots and controllers, etc. In many cases a proper identification of relevant sub-components of an entire sequence (e.g. an email address within an entire text) can only be done based on the results of a recognition (one needs to know the symbol sequence to detect an email address). But without having good constraints a decoding of a sequence into symbols is often erroneous ("free recognition") in comparison to a constraint decoding (e.g. when it is already known that the sequence should be an email address). Using the regular expression including RegEx-Groups, structured and semi-structured sequences can be parsed into relevant sub-components (e.g. an address can be parsed into zip code, city, street, house number, etc).

The regular expression can be transformed to a graph based model represented by a finite state automaton. A finite state automaton is a graphical model describing the behavior of a system by means of states and transitions. There exists a duality between finite state automaton and regular expressions. For each finite state automaton there exists a regular expression and vice versa. For example, the regular expression may be transformed to a non-deterministic finite state automaton, e.g. by using Thompson's algorithm. Alternatively, a deterministic model for a finite state automaton may be applied. There are other algorithms in place to transform a regular expression into a finite state automaton. The finite state automaton may be implemented as a finite state transducer. The finite state transducer may comprise a finite set of states, a finite input alphabet, a finite output alphabet, a set of initial states being a subset of the set of states, a set of final states being another subset of the set of states, and a transition relation. The finite state can be weighted. It can be interpreted as a weighted automaton covering the whole process, where each transition at each time point t is weighted by the probabilities of the most likely sequences of emissions using that arc of the automaton at time t.

The graph based model may be implemented by dynamic programming. Dynamic programming is a method for solving complex problems by breaking them down into simpler sub-problems. The graphical model may define all allowed transitions. For example, based on Viterbi's principle all paths with the highest probabilities can be calculated along the edges of the graphical model.

The confidence matrix can be stored on a memory of the computing device. The regular expression may be entered by an input device, for example a keyboard, a mouse or a touch sensitive screen. Alternatively, the regular expression may be entered by receiving the regular expression from another computing device, e.g. via a wired or wireless connection between the computing device and the other computing device.

The method may comprise a step of outputting the score value. The score value can be outputted to an output device, for example a display device or a printing device.

The disclosure refers to the usage of a computing device. The computing device may comprise one or more processors configured to execute instructions. Further, the computing device may comprise a memory in form of volatile memory (e.g. RAM—random access memory) and/or non-volatile memory (e.g. a magnetic hard disk, a flash memory or a solid state device). The computing device may further comprise means for connecting and/or communicating with other (computing) devices, for example by a wired connection (e.g. LAN local area network, Firewire (IEEE 1394) and/or USB—universal serial bus) or by a wireless connection (e.g. WLAN—wireless local area network, Bluetooth and/or WiMAX—Worldwide Interoperability for Microwave Access). The computing device may comprise a device for registering user input, for example a keyboard, a mouse and/or a touch pad. The computing device may comprise a display device or may be connected to a display device. The display device may be a touch-sensitive display device (e.g. a touch screen).

DESCRIPTION OF EMBODIMENTS

In the following, exemplary embodiments are disclosed with reference to figures of a drawing.

Figure 1:
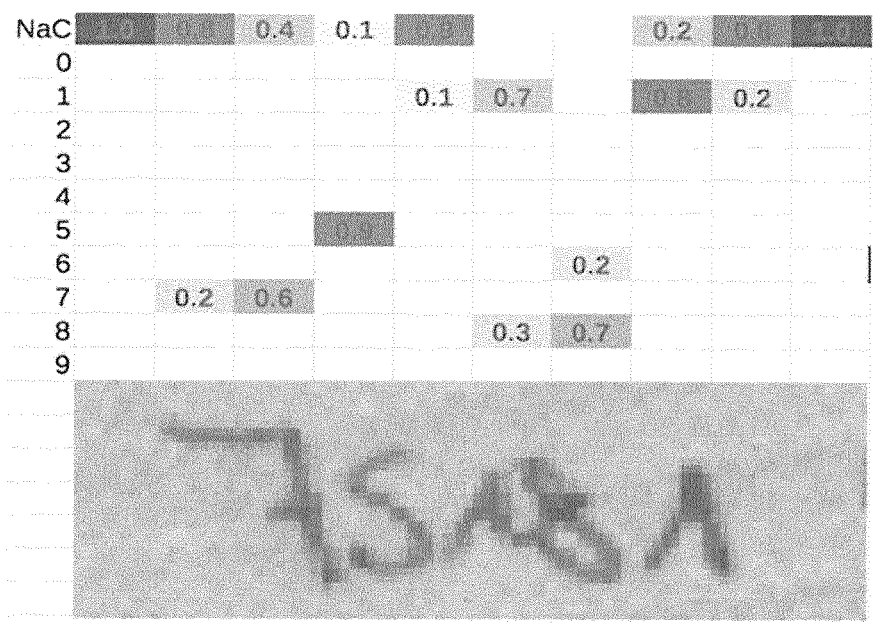
FIG. 1 shows an example for a confidence matrix.

FIG. 1 shows an example of a confidence matrix (ConfMat) of a short script sequence which is shown below the ConfMat. The ConfMat contains the digit-channels (0-9) and the NaC-channel. The darker the field at a position, the higher the confidence for a certain symbol (black equals 1.0 and white equals 0.0). In other embodiments, the confidence matrix may additionally contain a set of letters, e.g. A to Z as well as a to z, punctuation marks and/or control signs.

Figure 2:
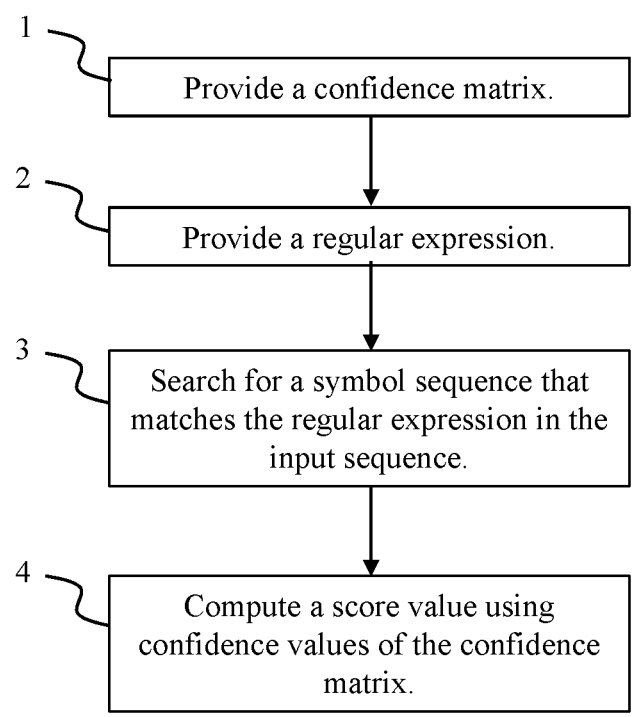
FIG. 2 shows a flow diagram for a method for text recognition.

In FIG. 2 a flow diagram for text recognition is shown. In step 1, a confidence matrix of an input sequence is provided. The confidence matrix is a digital representation of the input sequence. The input sequence can be a written text or a spoken text. An input of a regular expression is registered in step 2. In step 3, a symbol sequence that matches the regular expression is searched in the input sequence. For the search, a score value is computed using confidence values of the ConfMat (step 4).

Figure 3:
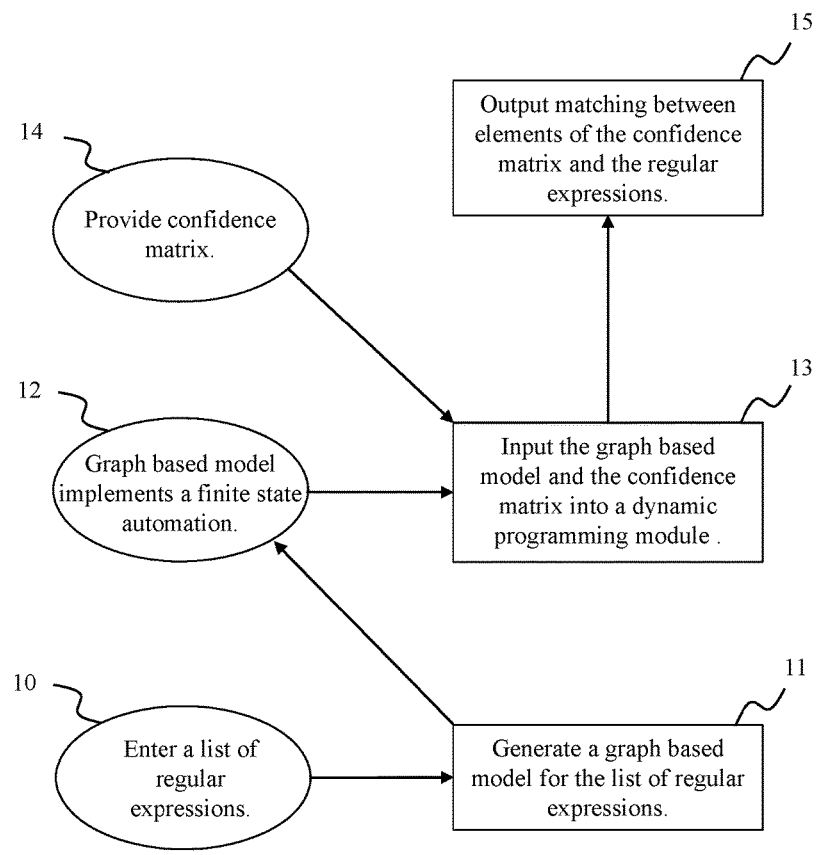
FIG. 3 shows further steps of the method for text recognition.

FIG. 3 shows an exemplary embodiment for recognizing text. An input sequence (e.g. written text or spoken text) is transformed in a confidence matrix 14. Details for transforming the input sequence are provided below with reference to FIG. 5. The confidence matrix comprises all confidences for the occurrence of all symbols of a symbol table (e.g. Latin 2) at a corresponding position of the input sequence. Matching and searching operations of an arbitrary regular expression can be performed on the given ConfMat. As a result of this operation matching scores (e.g. a matching probability) for the best matching result are derived. In addition, results for all labelled RegEx-Groups contained in the RegEx can be provided. For example, all results matching a RegEx-group comprising five digits (e.g. a postal code) can be outputted. All results can be provided as a result list sorted by scores. Scores can be confidences (e.g. pseudo probabilities) or also costs (e.g. negative logarithmic probabilities). As many embedded dictionaries as necessary can be used in the matching procedure. This enables the use of specific vocabularies at certain positions within the RegEx.

For scoring, a specific cost function based on negative logarithmic probabilities can be used, but also other scoring or cost functions can be used.

As search expression, a list of regular expressions is entered in step 10. The list may comprise one or more embedded dictionaries and/or RegEx-Groups. A graph based model is generated for the list of regular expressions in step 11, e.g. using Thompson's algorithm. This results in a graph based model comprising a finite state automaton, e.g. a finite state transducer (step 12). The graph based model and the confidence matrix are inputted in a dynamic programming module 13. Using, for example, the Viterby algorithm or the CTC algorithm (CTC—Connectionist Temporal Classification) a matching between the elements of the confidence matrix and the regular expression is determined in step 14. The results are outputted as a list in step 15. Confidence values can be provided. The list can be a sorted by the highest confidence. Further, RegEx-Groups can be included for parsing.

The value to be optimized:

In one embodiment, the sequence with the highest score (probability) for a given ConfMat and a given regular expression r is provided:

$$\bar{s} = \mathrm{argmax}_{s \in S(r)} \sum_{t=1}^{T} c_{s_t, t},$$

in which S(r) is the set of all sequences, which are described by the regular expression r, and t refers to the column in the ConfMat. S(r) may contain specific path treatment depending on the classifier module, e.g. optional NaCs between two symbols or consecutive repeated emissions of symbols in case of a CTC trained system. Using logarithmic probabilities $c_{a,t} = \ln p\,(a|y_t)$ as score values, the final sequence $\bar{s}$ can be calculated as follows:

$$\bar{s} = \mathrm{argmax}_{s \in S(r)} \ln\left(\prod_{t=1}^{T} p(s_t \mid y_t)\right) = \mathrm{argmax}_{s \in S(r)} p(s \mid y)$$

In other words, $\bar{s}$ is the sequence with the highest probability. Note that the probabilities at different positions are assumed to be independent.

Constructing the Graphical Model:

There are many algorithms in place to transform a regular expression into a finite state automaton. Thompson's algorithm can be used for constructing a non-deterministic automaton. A non-deterministic automaton in combination with the Viterbi Approximation is preferred before deterministic models due to lower computing costs and therefore a higher speed.

Dynamic Programming:

The graphical model defines all allowed transitions. Based on Viterbi's principle all paths with the highest probabilities will be calculated along the edges of the graphical model. The large performance trade-off in comparison to the calculation of many single sequences is based on the fact that only a small number of paths have to be evaluated and stored at each position—independent of the number of possible symbols for that specific transition.

Expanding finite state automatons by an additional output band leads to finite state transducers. Thus, finite state transducers can model the process if the output band provides the probabilities of the best paths up to the specific position.

The above described method provides the following advantages:
  fully automatic acquisition of the content of text sequences (e.g. writing and speech),
  no transcription errors because all information is stored in the ConfMat,
  fast processing of all requests (search and retrieval), complex requests are possible (e.g. by using regular expressions), sophisticated technology for content dependent parsing (e.g. by using RegEx-groups), robust recognition (even transcription) due to the use of embedded dictionaries (constraint recognition) e.g. zip code, city, street in an address or radio communication of pilots.

In the following, an example for performing the method is disclosed. For constructing the graphical model, Thompson's algorithm is used. The regular expression is the input for this algorithm, as an output it delivers a graph. The edges of the graph define all allowed symbol transitions. After any node an optional node for "seeing" a NaC is inserted.

Figure 4:
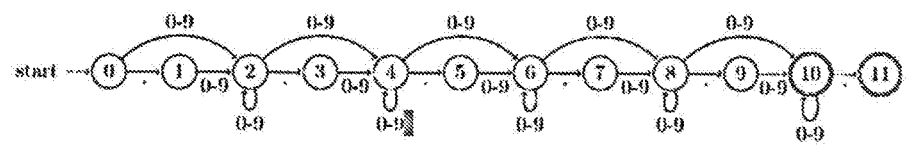
FIG. 4 shows an example for a graph model representation.

FIG. 4 shows an example for the RegEx: [0-9] {5} to represent a 5-digit number (e.g. a zip-code). Accepting states are marked by double circles.

The dynamic programming module now calculates probabilities along the edges based on the graph and a given ConfMat. For each edge in the graph and each sequence position the probabilities of most likely paths will be calculated. The sequence with the highest probability maximizes all sequence probabilities which reach to an accepted state at position t.

The sequence with the highest probability for a specific edge is calculated based on sequences with highest probabilities of previous edges multiplied with the ConfMat entry with the highest score value (largest emission probability of a symbol at time t). Thereby, we have to consider, that we do not construct any path emitting the same label at time t−1 and time t, except when the same edge is used. For the same reason, a sequence can spread the emission of symbols over several time steps and stay in the same arc as shown below.

For the exemplary ConfMat shown in FIG. 1, the following table for the path with the highest probability results:

| Time | 1 | 2 | 3 | 4 | 5 | 6 | 7 | 8 | 9 | 10 |
|---|---|---|---|---|---|---|---|---|---|---|
| State | 1 | 1 | 2 | 4 | 5 | 6 | 8 | 10 | 11 | 11 |
| Probability | 1.0 | 0.8 | 0.48 | 0.432 | 0.347 | 0.31 | 0.249 | 0.2 | 0.16 | 0.16 |

For example, the probability of state 1 at time 2 as probability that NaC (edge (0, 1)) is active by 2 time steps. In this case, the system is using the same edge and therefore has to emit the same label.

The largest probability of the edge (2,4) at time t is calculated as:

$$WK_{(2,4)}(t) = \max_{a \in [0,\ldots,9]} WK_{(2,4)}^a(t)$$

$$WK_{(2,4)}(t) = \max\Big(\max_{e \in \{(0,2),(1,2)\}} \max_{a \in [0,\ldots,9]} WK_e^a(t-1) \cdot \max_{l \in [0,\ldots,9], l \neq a} y_{l,t},$$

$$\max_{a \in [0,\ldots,9]} (WK_{(2,4)}^a(t-1) \cdot y_{a,t})\Big),$$

at which $WK_{(i,j)}(t)$ equals the probability of the most likely path via (i,j) at time t, $WK_{(i,j)}^a(t)$ equals the probability of the most likely path via (i,j) at time t emitting symbol a at last, and $l_{(i,j)}(t)$ represents the most likely emitted label at time t via (i,j). It is not sufficient for reaching the evidential optimum (see above) to calculate only the path with the highest probability. The probabilities $WK_{(i,j)}^a(t)$ of next likely paths also have to be considered at each time step, although restricting to the best two paths may be a reasonable approximation in practice.

In the following, an example for a complex regular expression is provided and features of the regular expression are discussed:

RegEx="(?<glabel1>[A-Za-zÄÖÜäöüβ]+)(|,)(?<glabel2>[[:dictID1:]])?((|,|:)(?<glabel3>[0-9]+)){5,8}[K-S]{3,5}?(foo|bar).*";

This RegEx consists of 7 groups or in other words, it is made up by 7 pairs of brackets, where 3 pairs are labelled. The syntax for labelling a group is: (?<name>).

The group named glabel1 describes strings constructed from upper and lower case letters and special characters from the German alphabet—expressed by "[A-Za-zÄÖÜäöüβ]", which can occur several times—expressed by "+". In case one likes to limit the number of repetitions this can for example be expressed by [K-S] {3,5}, this represents a string of 3 to 5 characters between K and S.

The group glabel2 contains a dictionary with the ID dictID1. A dictionary is a predefined list of words given to the decoder in advance.

Arbitrary characters can be expressed by the character ".", in case of an arbitrary number of repetitions the "." is followed by a "*", ".*" describes a completely arbitrary string (also an empty string).

Figure 5:
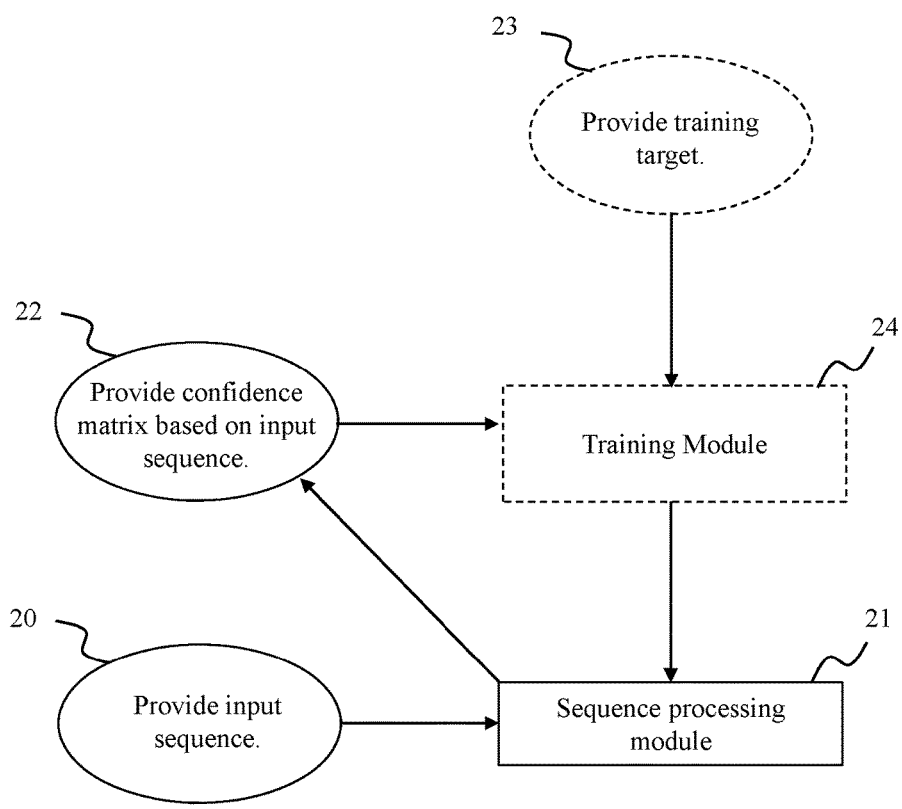
FIG. 5 shows a flow diagram for creating a confidence matrix.

In FIG. 5 a workflow for creating a confidence matrix is shown. An input sequence 20 (e.g. written text or spoken text) will by transformed by a sequence processing module 21 into a sequence of confidence vectors (e.g. containing pseudo probabilities). Each matrix column (confidence vector) contains the confidences for all symbol channels (and if necessary the additional NaC-channel) for a specific position of the input sequence. The specific NaC-channel is always active if at a certain position occurs an unknown symbol or a transition between symbols.

The ConfMat 22 is the result of this fully automatic coding process. The ConfMat is very compact (up to 50 times in comparison to the input sequence) and can be stored as an abstract representation of the content of the input sequence.

For training purposes a training target 23 can be provided, e.g. a string representation of the input sequence. The training target 23 can be transmitted to a training module 24 which can interact with the sequence processing module 21.

A confidence matrix can be created by the following steps: Construction of an input sequence by means of pre-processing and normalization of the original sequence (e.g. mean-variance normalization, Gabor Filtering). This results in a 2 dimensional input matrix. The input sequence is processed using a Convolutional Neural Network (CNN) containing one specific output neuron for each corresponding symbol channel. The output of the CNN will be collapsed (by summing up all values of the same channel) in y-dimension (orthogonal to sequence direction), the N channel neurons are the "new" y-dimension of the output. By means of a softmax activation function all activations of the output neurons at a certain sequence position will be normalized. The result is the ConfMat.

In training mode the following additional steps can be performed: calculation of an error gradient, based on a string representation of the expected output for the given sequence by means of the CTC algorithm (Connectionist Temporal Classification), the CNN will be trained using stochastic gradient descent algorithm based on the calculated error gradient.

The above described implementation is one embodiment to create a ConfMat from digital sequences. There are other classifiers in place able to perform similar steps (e.g. Support Vector Machines, recurrent neural networks (RNN)), but all of them need to perform the described operation to map a digital input sequence of feature vectors to a corresponding output sequence of confidence vectors.

The features disclosed in the specification, the claims and the figures can be relevant either alone or in any combination with each other for implementing embodiments.

The invention claimed is:

1. A method for text recognition, wherein the method is executed by a processor of a computing device and comprises steps of:
providing a two-dimensional confidence matrix, wherein the confidence matrix comprises a digital representation of an input sequence, wherein a first horizontal position within the confidence matrix corresponds to a position of the input sequence, wherein a first vertical position within the confidence matrix corresponds to a symbol channel, and wherein a first element of the confidence matrix comprises a confidence value for a corresponding symbol channel at the corresponding position in the input sequence,
entering a regular expression,
generating, based at least in part on the regular expression, a graph based model comprising a non-deterministic finite state automaton, the graph based model describing the regular expression using states and transitions, and
searching for a symbol sequence of the input sequence that matches the regular expression, wherein a score value is computed by the processor using confidence values of the confidence matrix, and the score value is an indication of the quality of the matching between the symbol sequence of the input sequence and the regular expression,
wherein the step of searching comprises one or more time steps, and further comprises:
dynamically determining, at each time step, based at least in part on the confidence value in the confidence matrix, a path with a largest probability, and a probability of a predefined number of next likely paths in the non-deterministic finite state automaton; and
wherein the predefined number of next likely paths evaluated at each time step is limited to two or less paths.

2. The method of claim 1, wherein the step of providing the confidence matrix includes transforming a written text or a spoken text into the confidence matrix.

3. The method of claim 1, wherein the regular expression comprises a regular expression group, wherein the regular expression defines labeled regions in the regular expression for parsing on the confidence matrix.

4. The method of claim 1, wherein the regular expression comprises an embedded dictionary.

5. The method of claim 1, further comprising transcribing the input sequence into a symbol sequence.

6. The method of claim 1, wherein the confidence matrix is a digital representation of a structured or semi-structured input sequence and wherein the method further comprises a step of parsing and labeling the structured or semi-structured input sequence using the regular expression, wherein a score value is assigned to each element of the input sequence.

7. The method of claim 1, further comprising a step of outputting the score value.

8. A non-transitory computer-readable medium comprising computer-executable instructions that, when executed by a processor of a computing device, performs a method comprising:
providing a two-dimensional confidence matrix, wherein the confidence matrix comprises a digital representation of an input sequence, wherein a first horizontal position within the confidence matrix corresponds to a position of the input sequence, wherein a first vertical position within the confidence matrix corresponds to a symbol channel, and wherein a first element of the confidence matrix comprises a confidence value for a corresponding symbol channel at the corresponding position in the input sequence;
entering a regular expression;
generating, based at least in part on the regular expression, a graph based model comprising a non-deterministic finite state automaton, the graph based model describing the regular expression using states and transitions; and
searching for a symbol sequence of the input sequence that matches the regular expression, wherein a score value is computed by the processor using confidence values of the confidence matrix, and the score value is an indication of the quality of the matching between the symbol sequence of the input sequence and the regular expression;
wherein the step of searching comprises one or more time steps, and further comprises:
dynamically determining, at each time step, based at least in part on the confidence value in the confidence matrix, a path with a largest probability, and a probability of a predefined number of next likely paths in the non-deterministic finite state automaton; and
wherein the predefined number of next likely paths evaluated at each time step is limited to two or less paths.

* * * * *